United States Patent Office 3,164,081
Patented Jan. 5, 1965

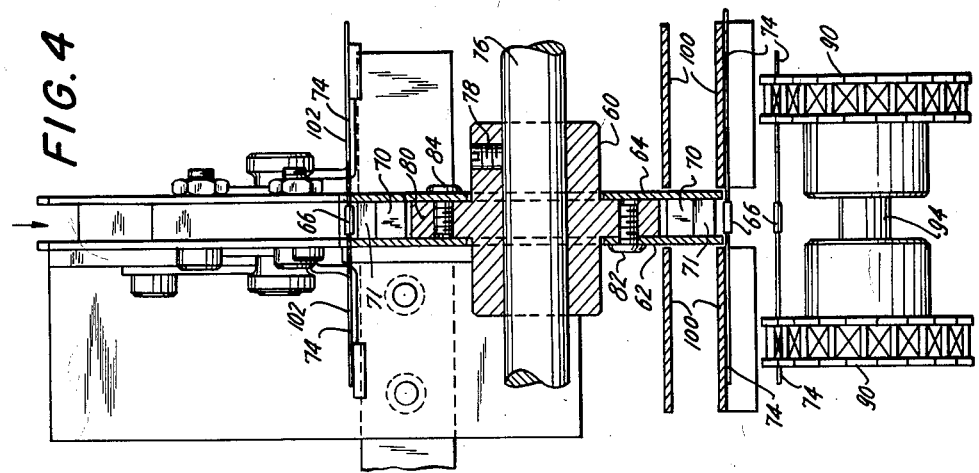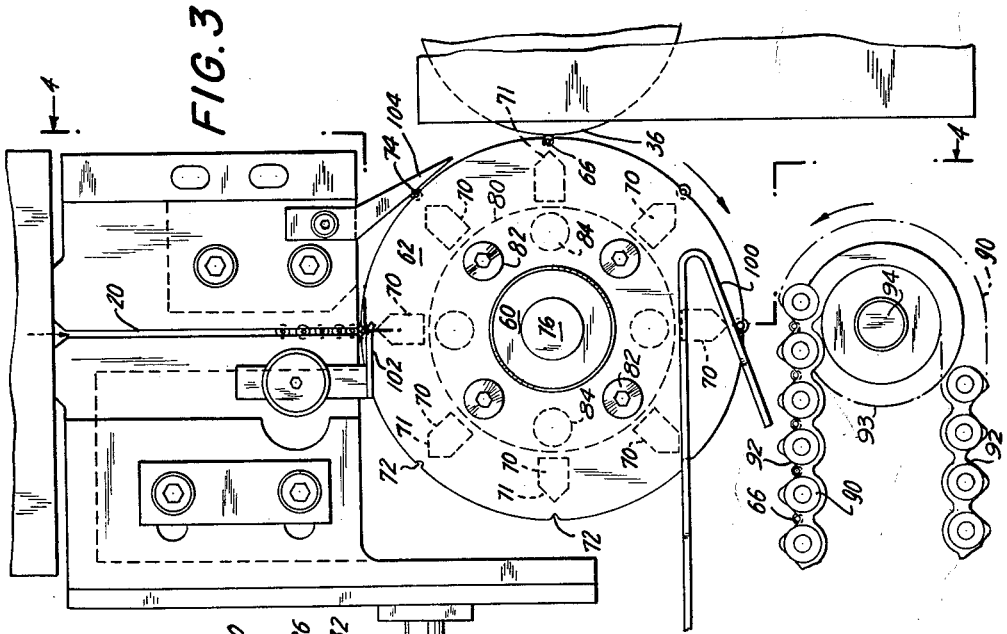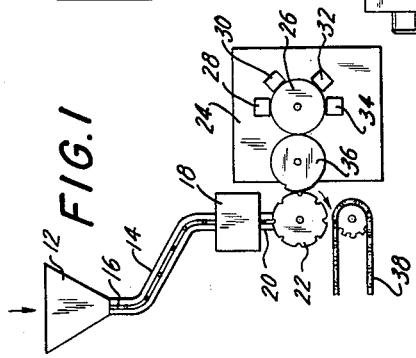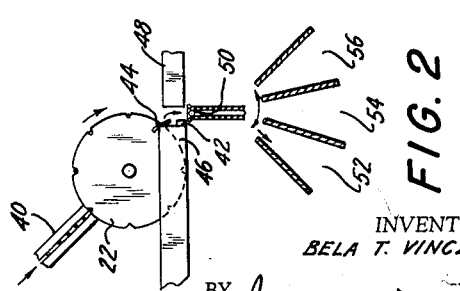
INVENTOR.
BELA T. VINCZE
BY James and Franklin
ATTORNEYS

3,164,081
ELECTRONIC COMPONENT PRINTER HAVING ROTATING MAGNETIC CHUCK
Bela T. Vincze, South Bellingham, Mass., assignor to General Instrument Corporation, Newark, N.J., a corporation of New Jersey
Filed Oct. 26, 1962, Ser. No. 233,329
5 Claims. (Cl. 101—38)

This invention relates to the handling of small electronic components, and more particularly to a rotating magnetic chuck for that purpose.

Electronic circuitry employs components, and with the advent of solid state devices, these components have become small and difficult to handle. A typical example is a glass diode having a small cylindrical body with oppositely extending axial lead wires. The body may be say 1/10 inch in diameter and 1/4 inch long. It is already known to hopper the diodes into a track or chute for gravitational feed, but escapement mechanism is needed to deliver the components one at a time from the chute, and to transfer the same to other apparatus for marking or testing or sorting the diodes.

The primary object of the present invention is to provide an improved chuck which acts as an escapement and transfer device. In accordance with my improvement, advantage is taken of the fact that the leads are ferro-magnetic by making the chuck magnetic. This greatly simplifies the chuck mechanism, and results in trouble-free operation with long wear, and with no damage to the diodes. The new chuck avoids the need for close adjustments or tolerance, and the chuck actually helps move a lowermost diode out of a chute.

To accomplish the foregoing general objects, and other more specific objects which will hereinafter appear, my invention resides in the apparatus elements and their relation one to another, as are hereinafter more particularly described in the following specification. The specification is accompanied by a drawing in which:

FIG. 1 is a schematic view, drawn to small scale, to illustrate the chuck used in combination with printing mechanism;

FIG. 2 is a similar small scale schematic view showing the use of the chuck in combination with testing and sorting mechanism;

FIG. 3 is an elevation, drawn to larger scale, of a part of the mechanism shown in FIG. 1; and FIG. 4 is a vertical section taken approximately in the plane of the stepped line 4—4 of FIG. 3.

Referring to the drawing, and more particularly to FIG. 1, the components, typically glass diodes, are supplied from a hopper 12 to a chute 14. The chute may be dimensioned to receive the body of the diode, the sides of the chute being slotted on opposite sides as indicated at 16, for passage therethrough of the oppositely extending wire leads of the component. A polarizing device is schematically indicated by the box 18. This device may be of known character, and tests the polarity of each diode, and reverses some of the diodes so as to deliver all diodes polarized in the same direction in an outgoing chute 20.

The diodes are fed one at a time from chute 20 by a chuck 22 which delivers them to a printing machine 24. This may be of the offset type, there being a lithographed plate roller 26 which receives ink from appropriate dampening and ink distributing rollers which are schematically suggested at 28, 30, 32 and 34. The ink on roll 26 is transferred by a rubber transfer roller 36 to the body of a component carried by the chuck 22. The marking may include bands of different color, in accordance with a marking code, and the different inking mechanisms 28–34 may provide the different colors. The identifying insignia or trademark of the manufacturer and other such data may be applied.

After the printing operation the components may be delivered to a suitable conveyor 38. The rotation of the chuck 22 may be intermittent, and the same applies to the motion of conveyor 38.

The magnetic chuck is shown combined with different mechanism in FIG. 2. In this case the components, say glass diodes, are fed down a suitable track or chute 40 leading to magnetic chuck 22. The components are transferred to a test station at 42, where they are stripped from the chuck by suitable strippers 44. The lead wires of the components are intermittently clamped between a stationary contact 46 and a movable contact 48. The contacts lead to test equipment which tests the diodes for a desired characteristic, and an oscillatable nozzle 50 is tilted one way or another, in accordance with the result of the test. On retraction of the contact 48 the diode is released and falls through the nozzle 50 and into one or another of a plurality of bins 52, 54 and 56, thereby classifying or sorting the diodes.

The chuck 22 is shown in greater detail in FIGS. 3 and 4 of the drawing. Referring to those figures, the chuck comprises a rotatable hub 60 carrying a pair of discs 62 and 64. These discs are spaced apart an amount slightly greater than the length of the body of the component, such a body being indicated at 66 in FIG. 4.

A plurality of permanent magnets are disposed around the discs. In the present case there are eight such magnets marked 70. They are located around the hub 60 between the discs 62 and 64.

The peripheries of the discs are notched at each magnet, as shown at 72, to receive the lead wires 74 of a component. The notches 72 have a depth slightly more than 1/2 of the diameter of the body of a component. With the lead wire received in the notch, the component is received within the periphery of the chuck, thus permitting a lowermost component to escape from the chute 20 above the chuck each time a notch reaches the chute. The notches 72 are located at the magnets 70, that is, in radial alignment therewith.

The magnets 70 are polarized radially of the chuck, and the outer or working side of the magnet is preferably gabled, as shown at 71, to concentrate the magnetic flux at the axis of the component being attracted. It may be mentioned that the body of the component need not itself be ferrous or ferromagnetic. In the case of a glass diode the leads typically are Dumet metal or Kovar, either of which includes a ferrous core, and is thus subject to magnetic attraction.

The magnets may be located outside the discs, but in that case it is necessary to employ twice as many magnets. I have made and used such a chuck, but the present arrangement with the magnets between the discs is found preferable. One disadvantage of the outside magnets is that if the lead wire of a component is bent, there is a tendency to tip the component and the opposite lead wire. This does not happen with the center magnets here shown.

In the particular case illustrated the magnets are rubberized magnets which are held between the discs by cementing the same in position. A particular example is the rubberized magnet sold under the name "Plastiform" by the Leyman Corporation of Cincinnati, Ohio.

The hub portion 60 is secured to a drive shaft 76, as by means of a set screw 78. In the particular structure here shown the disc 62 is secured to one side of a center flange 80 by means of four screws 82. The disc 64 is fastened on the opposite side of flange 80 by four screws 84. The screws on one side are offset from those on the other, as shown in FIG. 3. The discs and hub could be made integral, if desired.

In the present case the chuck is turned intermittently one eighth of a revolution at a time. After ninety degrees the component is brought to the printing station where it is printed by the roller 36 (FIG. 1) previously mentioned.

After 180 degrees the component is delivered to a conveyor made up of spaced chains 90. These have notches 92 to receive the lead wires 74 of the components 66. The chains are carried by sprockets 93 mounted on a shaft 94 which is moved intermittently in one-to-one ratio with the chuck, that is, one pocket on the conveyor is advanced for each one eighth revolution of the chuck.

The components are stripped from the chuck by strippers or pick-off fingers, indicated at 100. These have sloping camming surfaces so located that the lead wires move against the said surfaces, and are dislodged thereby from the chuck. There are two strippers, one at each side of the chuck, as is clearly shown in the drawing. An additional advantage of the inside magnets here shown, over outside magnets, is that the strippers may be close to the chuck, whereas with outside magnets the strippers are located outside the outside magnets.

Although not essential, leveling fingers may be provided at the lower end of the chute 20. These are shown at 102. They serve the purpose of eliminating possible tilt of a component at the lower end of the chute.

When the treatment of the component is a printing operation, it is desirable to slightly move the body in axial direction toward one disc and away from the other, so that the location of the body may be gauged with respect to the first disc. For this purpose a bias finger 104 may be provided, as shown in FIG. 3. It engages one end of the component bodies, and yieldingly nudges the same axially toward the opposite disc. This establishes a desired relation between the body and the printing roller 36.

The magnet 70 is preferably located close to the body of the component, but not in contact therewith. A definite clearance is provided. This has the advantage that there is no interference with free rotation of the component on the lead wires. Such free rotation is convenient not only during stripping of the components from the chuck, but also, and importantly, during the printing operation. The clearance should allow for a slight inward pressure of the component, which is applied by the print wheel 36 during the printing operation. In a specific case the clearance was 0.060 inch.

In the specific case illustrated the "Plastiform" magnets were made from bars having a cross section of ¼ inch by ⅜ inch, with the direction of magnetism in the direction of the ⅜ inch dimension. The outer face of the bar was beveled on opposite sides at an angle of forty-five degrees, forming a gable or edge having an angle of ninety degrees. The length of the magnet, that is, the length of the pieces cut from the bar, corresponds to the distance between the discs of the chuck, and in the particular case shown is only a little more than one quarter inch. This dimension would depend on the length of the body of the component being handled.

All dimensions given herein are given solely by way of example, and are not intended to be in limitation of the invention.

It is believed that the construction and method of use of my improved magnetic chuck, as well as the advantages thereof, will be apparent from the foregoing detailed description. It will also be apparent that while I have shown and described the invention in a preferred form, changes may be made without departing from the scope of the invention, as sought to be defined in the following claims.

I claim:

1. Apparatus for handling small electronic components having a glass body with oppositely extending lead wires made of metal which is at least partially ferromagnetic, said apparatus comprising a rotatable chuck, a magazine above the chuck with its lower end at the periphery of the chuck for feeding components to the chuck, said chuck comprising a rotatable hub, a pair of discs carried thereby, said discs being spaced apart an amount greater than the length of the body of the component, but much less than the length of the lead wires, a plurality of permanent magnets disposed around the discs, the peripheries of the discs being notched at each magnet to receive the lead wires, said notches being too small to receive the body, the magnets being located on a circle of smaller radius than that of the notches and close enough to the notches to attract and hold the lead wires in the notches, and a stationary bias finger following the magazine and located near one disc for yieldably bearing against the end of the body of a component and urging said body toward the other disc as the components pass said bias finger.

2. Apparatus for handling small electronic components having a cylindrical glass body with oppositely extending axial lead wires made of metal which is at least partially ferromagnetic, said apparatus comprising a rotatable chuck, a magazine above the chuck with its lower end at the periphery of the chuck for feeding components to the chuck, said chuck comprising a rotatable hub, a pair of discs carried thereby, said discs being spaced apart an amount greater than the length of the body of the component, but much less than the length of the lead wires, a plurality of permanent magnets disposed around the hub between the discs, the peripheries of the discs being notched at each magnet to receive the lead wires, said notches being too small to receive the body, the magnets being located on a circle of smaller radius than that of the notches and close enough to the notches to attract and hold the lead wires in the notches, and a stationary bias finger following the magazine and located near one disc for yieldably bearing against the end of the body of a component and urging said body toward the other disc as the components pass said bias finger.

3. Apparatus for handling small electronic components having a glass body with oppositely extending lead wires made of metal which is at least partially ferromagnetic, said apparatus comprising a rotatable hub, a pair of discs carried thereby, said discs being spaced apart an amount slightly greater than the length of the body of the component, but much less than the length of the lead wires, a plurality of permanent magnets disposed around the discs, the peripheries of the discs being notched at each magnet to receive the lead wires, said notches being too small to receive the body, the magnets being located on a circle of smaller radius than that of the notches and close enough to the notches to attract and hold the lead wires in the notches, a magazine chute leading downward to and so nearly contacting said discs that a component escapes from the magazine only when the notches reach the magazine chute, and a stationary bias finger following the magazine chute and located near one disc for yieldably bearing against the end of the body of a component and urging said body toward the other disc as the components pass said bias finger.

4. Apparatus for handling small electronic components having a glass body with oppositely extending lead wires made of metal which is at least partially ferromagnetic, said apparatus comprising a rotatable chuck, a magazine above the chuck with its lower end at the periphery of the chuck for feeding components to the chuck, said chuck comprising a rotatable hub, a pair of discs carried thereby, said discs being spaced apart an amount slightly greater than the length of the body of the component, but much less than the length of the lead wires, a plurality of permanent magnets disposed around the discs, and the peripheries of the discs being notched at each magnet to receive the lead wires, said notches being too small to receive the body but deep enough for escape of the body from the magazine, the magnets being located on a circle of smaller radius than that of the notches and close enough to the notches to attract and hold the lead wires in the notches, a stationary bias finger following the magazine and located near one disc for yieldably bearing against the end of the body of a component and urging said body toward the other disc as the components pass said bias finger, and strippers outside the discs and magnets, said strippers having sloping camming surfaces so located that the lead wires move against the surfaces and are dislodged thereby from the discs.

5. Apparatus for handling small electronic components having a cylindrical glass body with oppositely extending axial lead wires made of metal which is at least partially ferromagnetic, said apparatus comprising a rotatable chuck, a magazine above the chuck with its lower end at the periphery of the chuck for gravitationally feeding components to the chuck, a printing unit at the side of the chuck for treating a component being carried by the chuck from the magazine, a conveyor beneath the chuck, and strippers outside the discs, said strippers including sloping camming surfaces which engage the lead wires and transfer the components from the chuck to the conveyor, said chuck comprising a hub, a pair of discs carried thereby, said discs being spaced apart an amount somewhat greater than the length of the body, but much less than the length of the lead wires, a plurality of permanent magnets disposed about the hub between the discs, the peripheries of the discs being notched at each magnet to receive the lead wires of a component for escape of the body of the component from the magazine, said notches being too small to receive the body, the magnets being located on a circle of smaller radius than that of the notches and close enough to the notches to attract and hold the lead wires in the notches, and a stationary bias finger following the magazine and located near one disc for yieldably bearing against the end of the body of a component and urging said body toward the other disc as the components pass said bias finger.

References Cited by the Examiner
UNITED STATES PATENTS

| | | | |
|---|---|---|---|
| 2,442,102 | 5/48 | Tenety | 101—40 X |
| 2,919,801 | 1/60 | Pechy | 198—41 X |
| 2,994,263 | 8/61 | Rus | 101—40 X |

FOREIGN PATENTS 1,064,775  12/53  France.

WILLIAM B. PENN, *Primary Examiner.*